(12) United States Patent
Kim

(10) Patent No.: US 9,397,429 B2
(45) Date of Patent: Jul. 19, 2016

(54) INTERLOCK PIN AND BATTERY PACK HAVING THE SAME

(71) Applicant: SAMSUNG SDI CO., LTD., Yongin-si, Gyeonggi-do (KR)

(72) Inventor: Myung-Chul Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/475,208

(22) Filed: Sep. 2, 2014

(65) Prior Publication Data

US 2015/0064983 A1 Mar. 5, 2015

(30) Foreign Application Priority Data

Sep. 4, 2013 (KR) ........................ 10-2013-0106119

(51) Int. Cl.
*H01R 13/627* (2006.01)
*H01R 13/04* (2006.01)
*H01R 13/707* (2006.01)
*H01R 13/41* (2006.01)

(52) U.S. Cl.
CPC .............. *H01R 13/04* (2013.01); *H01R 13/707* (2013.01); *H01R 13/41* (2013.01)

(58) Field of Classification Search
CPC ....... H01R 13/04; H01R 13/707; H01R 13/41
USPC .................. 439/692, 181, 507, 511, 512, 513
See application file for complete search history.

(56) References Cited

U.S. PATENT DOCUMENTS

| | | | | |
|---|---|---|---|---|
| 5,103,199 A * | 4/1992 | Ootsuka | ............... | H01H 50/323 335/133 |
| 5,505,428 A * | 4/1996 | De Moss | ............... | F16K 5/0615 137/614.06 |
| 6,053,762 A * | 4/2000 | Matsumura | ............ | H01H 9/085 439/484 |
| 7,726,975 B2 * | 6/2010 | Christensen | ........ | H01M 6/5005 429/50 |
| 7,807,288 B2 * | 10/2010 | Yoon | .................... | H01M 2/1061 320/112 |
| 7,946,871 B1 * | 5/2011 | Yu | ........................... | H01R 13/53 439/181 |
| 8,192,212 B2 * | 6/2012 | Casses | ................ | B60L 11/1818 439/181 |
| 8,313,855 B2 * | 11/2012 | Muis | ..................... | H01M 2/206 429/158 |
| 8,382,505 B2 * | 2/2013 | Park | ........................ | A45D 20/12 439/181 |
| 8,905,770 B2 * | 12/2014 | Fujiwara | .............. | H01R 13/516 439/181 |
| 2010/0112843 A1 * | 5/2010 | Heichal | ..................... | B60K 1/04 439/299 |
| 2011/0111649 A1 * | 5/2011 | Garascia | ............. | H01M 2/1077 439/890 |
| 2011/0127154 A1 | 6/2011 | Oh et al. | | |
| 2012/0094509 A1 * | 4/2012 | Bryan | .................. | B60Q 11/005 439/76.1 |
| 2013/0045633 A1 * | 2/2013 | Murakami | ........... | H01R 13/447 439/626 |
| 2013/0288530 A1 * | 10/2013 | Zhao | ..................... | H01M 2/206 439/627 |
| 2014/0162497 A1 * | 6/2014 | Lim | ......................... | B60L 3/04 439/620.26 |
| 2015/0064983 A1 * | 3/2015 | Kim | ....................... | H01R 13/04 439/692 |

FOREIGN PATENT DOCUMENTS

| | | |
|---|---|---|
| JP | 2009-231171 | 10/2009 |
| JP | 2011-166993 | 8/2011 |
| KR | 10-2011-0061057 | 6/2011 |

* cited by examiner

*Primary Examiner* — Abdullah Riyami
*Assistant Examiner* — Nelson R Burgos-Guntin
(74) *Attorney, Agent, or Firm* — Lewis Roca Rothgerber Christie LLP

(57) ABSTRACT

An interlock pin includes a pin portion and a body portion. The pin portion includes a plurality of electrical input/output pins. The body portion accommodates at least a portion of the pin portion. In the interlock pin, the pins of the pin portion extend from the body portion along a first direction and, a furthest point from one end of the body portion is further along the first direction than a physical contact point between the body portion and the pin portion.

14 Claims, 8 Drawing Sheets

INTERLOCK PIN AND BATTERY PACK HAVING THE SAME

CROSS-REFERENCE TO RELATED APPLICATION

This application claims priority to and the benefit of Korean Patent Application No. 10-2013-0106119, filed on Sep. 4, 2013 in the Korean Intellectual Property Office, the entire contents of which are incorporated herein by reference in their entirety.

BACKGROUND

1. Field

An aspect of embodiments according to the present invention relates to an interlock pin and a battery pack having the same.

2. Description of the Related Art

Generally, in a vehicle, current is generated, and the generated current is stored in a battery. In addition, other electronic devices such as a lamp and a radio may be operated using the stored current. However, a high-voltage electric vehicle, a fuel cell vehicle, or a hybrid vehicle using two or more power sources may use relatively higher voltage components than the driving voltage of other, existing vehicles, including a high-voltage battery, an electric motor, and the like.

While different metals have different characteristics depending on quality or kind of material, a spark and/or an arc may be continuously or regularly generated at a voltage of about 9V or more. The arc may be generated when a mechanical contact is released or disconnected. When a connector is separated or disconnected in a state in which power is applied, for example, to an electric vehicle, an arc may be generated. The arc may damage a component and/or a system in the electric vehicle or may cause fire in the electric vehicle.

An interlock pin may be used in order to solve such a problem. The interlock pin may be connected to or inserted into a protection circuit module or battery management system (BMS) before current is applied (e.g., before high current flows from a high-voltage battery to an electric component). Also, before an external connector is disconnected from the high-voltage battery while the current is applied (e.g., after the high current of the high-voltage battery has been applied therethrough), the interlock pin may be separated from the BMS. When the interlock pin is separated from the BMS, the flow of the current is cut off (e.g., stopped), so that it is possible to prevent the generation of an arc when the external connector is disconnected from the high-voltage battery.

Meanwhile, vibrations may be transferred to the interlock pin when used in an electric vehicle, etc., due to an environment in which the vehicle is driven. The vibrations may cause a problem with the structural stability of the interlock pin. Thus, vibration resistance of the interlock pin is a consideration of the safety structure of a battery disconnected unit (BDU) using the interlock pin.

SUMMARY

Aspects of embodiments of the present invention provide an interlock pin and a battery pack having the same which may prevent the generation of an arc when an external connector is disconnected from the battery pack.

Aspects of embodiments of the present invention also provide an interlock pin which may maintain structural stability even when the interlock pin is exposed to many vibrations due to its use in an electric vehicle or the like.

Aspects of embodiments of the present invention also provide an interlock pin having an insulation structure which is structurally stable due to its vibration resistance and electrically stable even in a high-current environment.

According to an embodiment of the present invention, an interlock pin includes a pin portion including a plurality of electrical input/output pins; and a body portion accommodating at least a portion of the pin portion, wherein the pins of the pin portion extend from the body portion along a first direction, and a furthest point from one end of the body portion is further along the first direction than a physical contact point between the body portion and the pin portion.

One or more grooves may be at the physical contact point between the body portion and the pin portion.

The grooves may be between the pins and at respective outer sides of the pins.

The grooves may extend around a perimeter of each of the pins.

An upper surface of each of the grooves may be upwardly curved.

The body portion may include protruding portions extending from a surface thereof, and the protruding portions may be spaced from the pins.

The protruding portions may be at respective outer sides of the pins.

The pin portion may include an input pin, an output pin, and a connecting portion, the connecting portion may couple the input and output pins to each other.

The pin portion may include an input pin and an output pin. The body portion may include a conductive material and may couple the input and output pins to each other.

According to an embodiment of the present invention, a battery pack includes an interlock pin including a pin portion including a plurality of input/output pins and a body portion accommodating at least a portion of the pin portion; and a battery management system (BMS) including a control portion configured to accommodate the input/output pins, wherein the BMS is configured to be electrically connected or disconnected by inserting or removing the input/output pins of the interlock pin into or from the control portion, and a physical contact point between the pin portion and the body portion is spaced from the control portion.

The battery pack may further include a pack housing configured to accommodate one or more batteries and the BMS, the pack housing may have an opening portion through which at least a portion of the control portion of the BMS is exposed; and a cover portion configured to cover the opening portion, the cover portion having an interlock pin accommodating portion configured to accommodate at least a portion of the interlock pin.

A synthetic resin may be between the interlock pin accommodating portion and the interlock pin.

The interlock pin may have a groove at the physical contact point between the pin portion and the body portion and a protruding portion extending from a surface of the body portion.

A sum of a depth of the groove and a length of the protruding portion may be greater than a width of the input/output pins.

According to aspects of embodiments of the present invention, it is possible to prevent the structural contact point between the body portion and the pin portion of the interlock pin from being in direct contact with a molded product accommodating the interlock pin, thereby improving the vibration resistance of the interlock pin.

Further, at least a portion of the body portion and/or the pin portion of the interlock pin may be fixed by a synthetic resin, so that it is possible to maintain the electrical stability of the entire device even in a high-current environment.

BRIEF DESCRIPTION OF THE DRAWINGS

Example embodiments will now be described more fully hereinafter with reference to the accompanying drawings; however, the present invention may be embodied in many different forms and should not be construed as limited to the embodiments set forth herein. Rather, these embodiments are provided so that this disclosure will be thorough and complete, and will fully convey the scope of the present disclosure to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
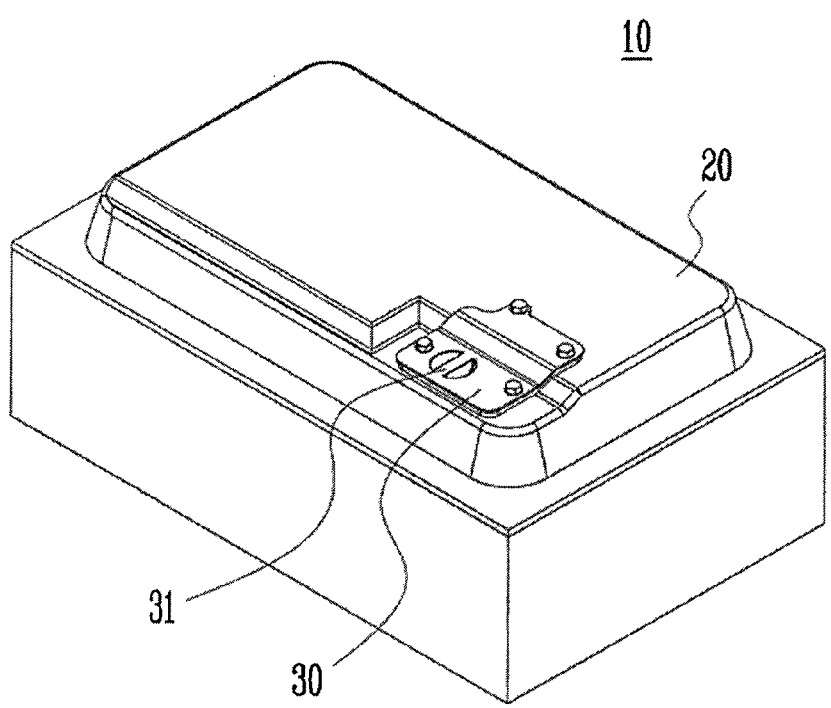
FIG. 1 is a perspective view showing a battery pack according to an embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. It will be further understood that the terms "comprises" and/or "comprising" used herein specify the presence of stated features or components, but do not preclude the presence or addition of one or more other features or components. Further, the use of "may" when describing embodiments of the present invention refers to "one or more embodiments of the present invention."

Figure 2:
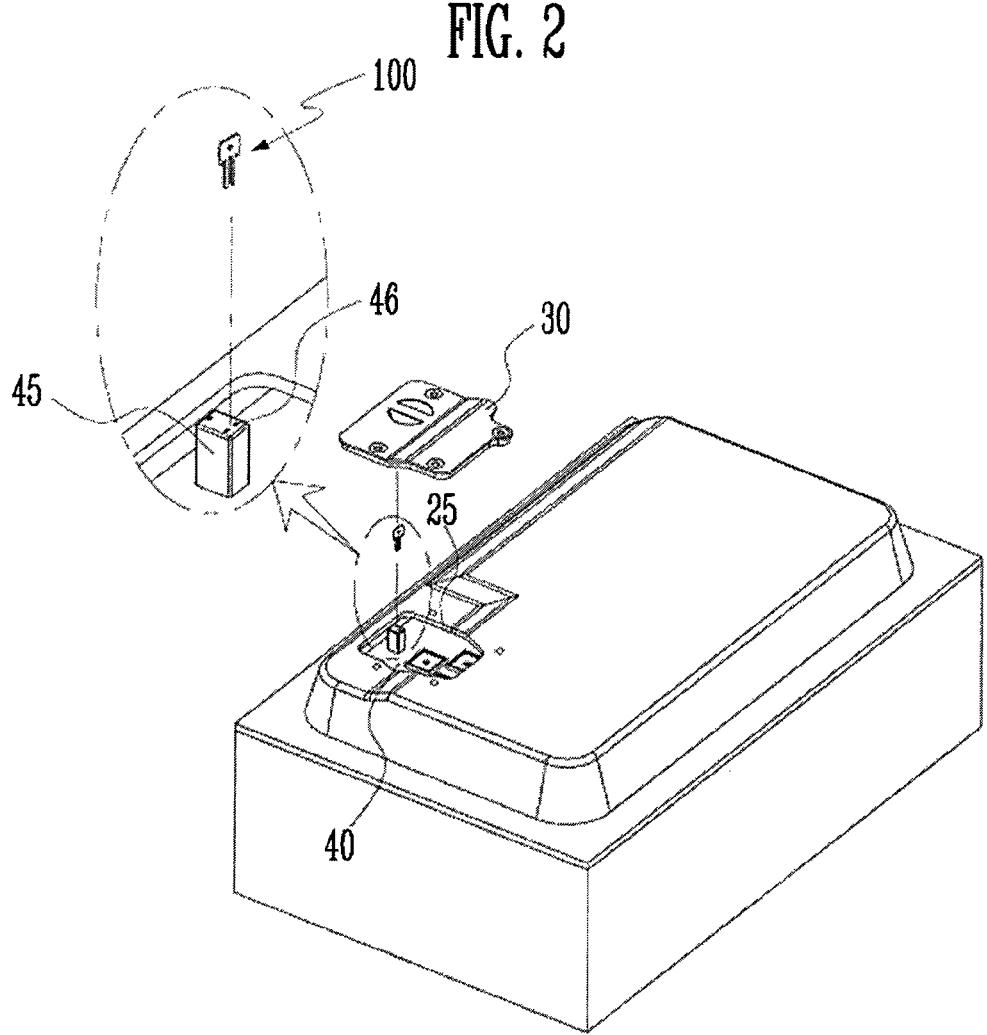
FIG. 2 a partially exploded perspective view showing the battery pack according to the embodiment shown in FIG. 1 of the present invention.
Figure 3:
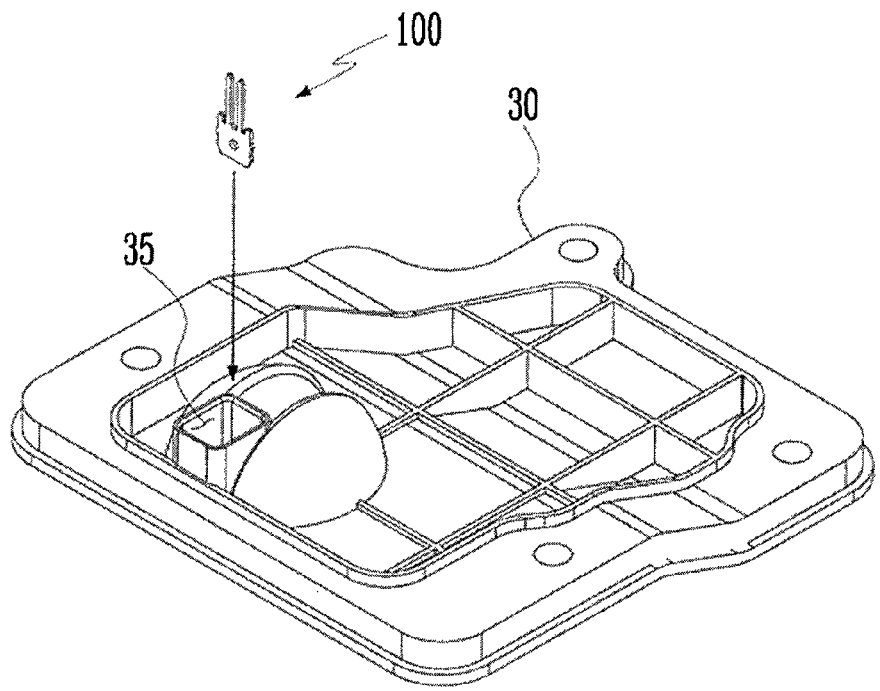
FIG. 3 is a bottom exploded perspective view showing a cover portion according to the embodiment shown in FIG. 1 of the present invention.
Figure 4:
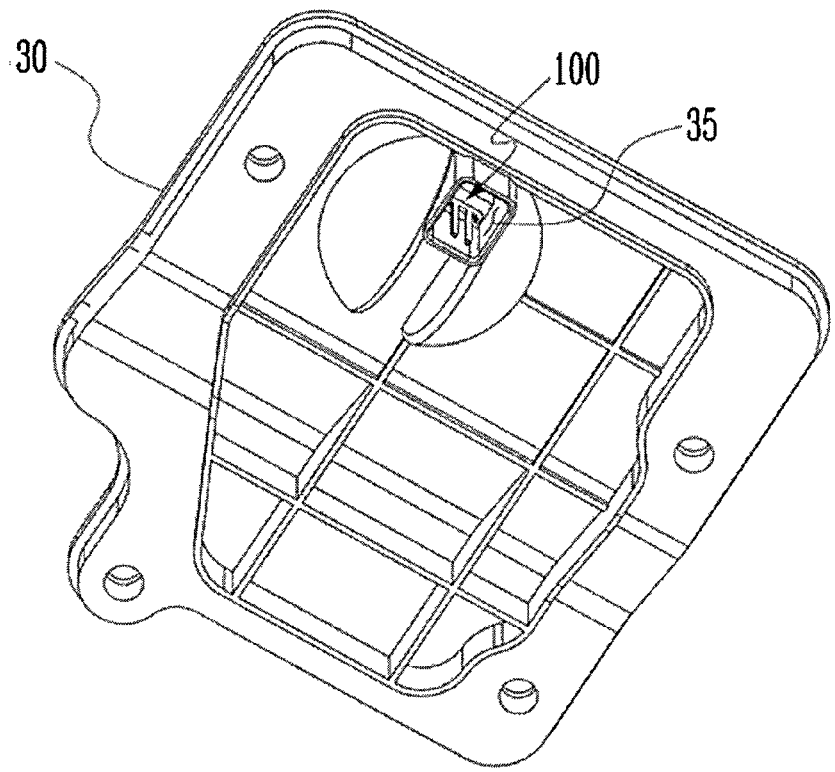
FIG. 4 is a bottom perspective view showing the cover portion according to the embodiment shown in FIG. 1 of the present invention.

Hereinafter, a battery pack according to an embodiment of the present invention will be described with reference to FIGS. 1 to 4. FIG. 1 is a perspective view showing a battery pack according to an embodiment of the present invention. FIG. 2 is a partially exploded perspective view showing the battery pack according to the embodiment shown in FIG. 1 of the present invention. FIG. 3 is a bottom exploded perspective view showing a cover portion according to the embodiment shown in FIG. 1 of the present invention. FIG. 4 is a bottom perspective view showing the cover portion according to the embodiment shown in FIG. 1 of the present invention.

Referring to FIG. 1, the battery pack 10 according to this embodiment includes a pack housing 20 and a cover portion 30. The pack housing 20 accommodates one or more batteries and a battery management system (BMS) therein. Here, the BMS may manage processes related to the input/output and charging/discharging of the corresponding batteries. The cover portion 30 opens/closes a portion of the pack housing 20 by being mounted to or separated from the pack housing 20.

When the cover portion 30 is separated from the pack housing, as shown in FIG. 2, a portion of the BMS 40 may be exposed to the outside of the pack housing through an opening portion 25. A control portion 45 may be included at the exposed area of the BMS 40. The control portion 45 may have an open-circuit (e.g., an opened-circuit) as a portion of a wire harness of the BMS 40. The state of the BMS 40 may be changed into an on-state by inserting an interlock pin 100, further described later, into an insertion opening 46 (e.g., an insertion hole) of the control portion 45 so that the control portion 45 is short-circuited (e.g., connected). Alternatively, the state of the BMS 40 may be changed into an off-state by separating or removing the interlock pin 100 from the control portion 45.

The interlock pin 100, as shown in FIGS. 3 and 4, may be accommodated in a lower portion of the cover portion 30. An interlock pin accommodating portion 35 for accommodating at least a portion of the interlock pin 100 may be formed at the lower portion of the cover portion 30.

The configuration of the interlock pin 100 and the coupling structure between the interlock pin 100 and the interlock pin accommodating portion 35 will be described in further detail below.

Figure 5:
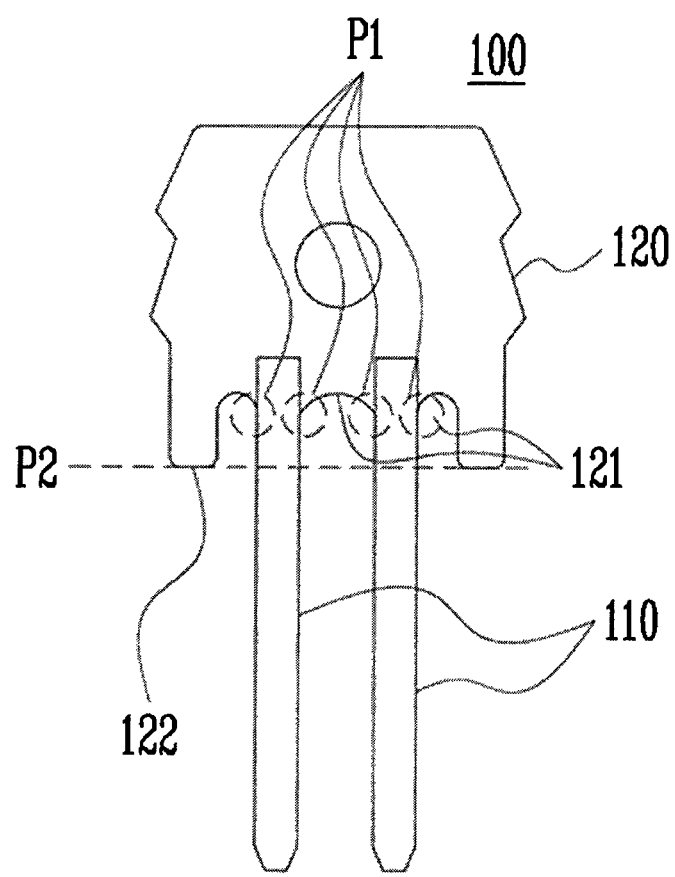
FIG. 5 is a longitudinal sectional view showing an interlock pin according to an embodiment of the present invention.
Figure 6:
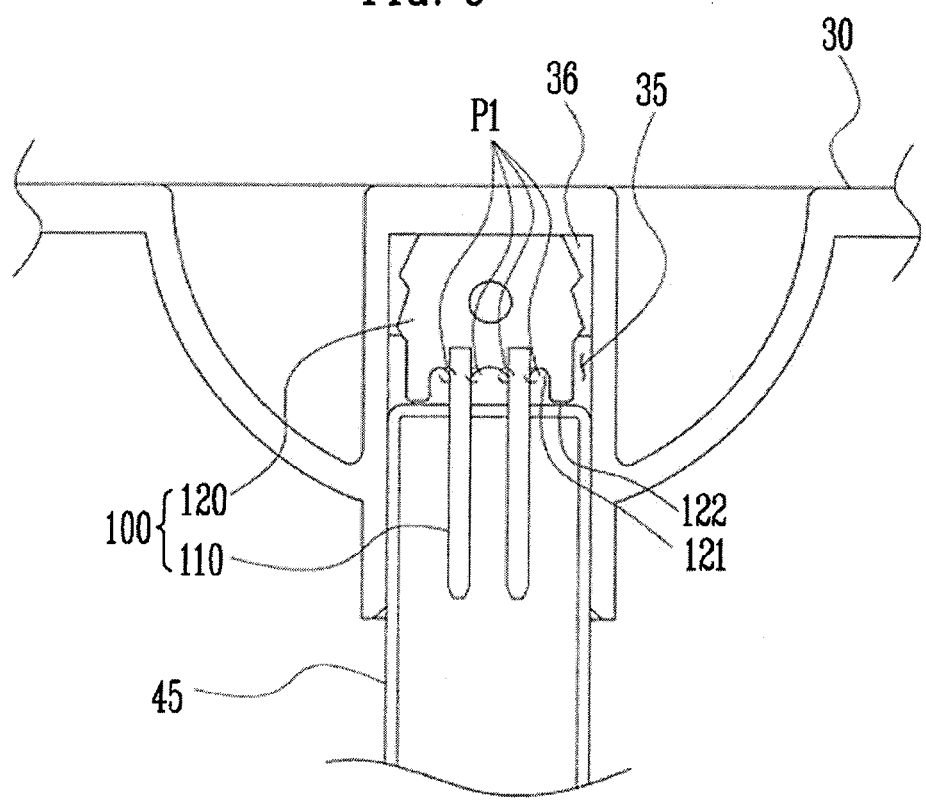
FIG. 6 is a longitudinal sectional view showing a state in which the interlock pin according to the embodiment shown in FIG. 5 of the present invention is accommodated in the cover portion.
Figure 7:
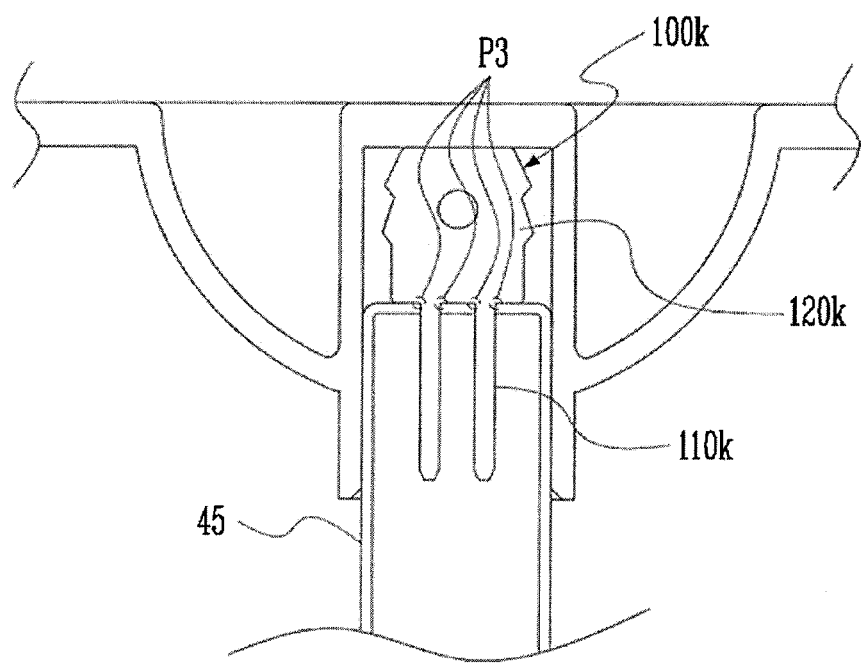
FIG. 7 is a longitudinal sectional view showing a state in which an interlock pin according to a comparative example is accommodated in the cover portion.

Hereinafter, an interlock pin according to an embodiment of the present invention will be described with reference to FIGS. 5 to 7. FIG. 5 is a longitudinal sectional view showing the interlock pin according to one embodiment of the present invention. FIG. 6 is a longitudinal sectional view showing a state in which the interlock pin according to the embodiment shown in FIG. 5 of the present invention is accommodated in the cover portion. FIG. 7 is a longitudinal sectional view showing a state in which an interlock pin according to a comparative example is accommodated in the cover portion.

The interlock pin electrically connects/disconnects from (e.g., is electrically on/off with) the wire harness of the BMS 40. Thus, the interlock pin 100 may be first connected to the BMS 40, that is, the interlock pin 100 may be connected to the BMS 40 before the voltage of a main power source is applied to a high-voltage battery, so that a current may flow. Then, the voltage of the main power source may be applied to the high-voltage battery. In the state in which the voltage is applied to the high-voltage battery, the interlock pin 100 may first separate from the BMS 40 before a connector (e.g., an external connector) is disconnected from the high-voltage battery to block or stop the flow of the current. As such, the interlock pin 100 may prevent an arc from being generated when the voltage of the main power source is applied to or blocked from the connector.

As shown in FIG. 5, the interlock pin 100 according to this embodiment includes a body portion 120 and a pin portion 110. The pin portion 110 may be formed with pins (e.g., may be formed with a pair of pin-shaped conductors) for receiving and/or transferring an electrical input or output.

The body portion 120 may fix the pin portion 110 in a state in which the body portion 120 accommodates portions of pins of the pin portion 110. The body portion 120 may be formed of a conductive material to couple (e.g., electrically connect) the pins of the pin portion 110 so that current may flow in one of the pins of the pin portion 110, in the body portion 120, and to another one of the pins of the pin portion 110.

Meanwhile, the lowest point P2 of the body portion 120 may be separated from a physical contact point P1 between the body portion 120 and the pin portion 110 (e.g., a portion at which the body portion 120 and the pin portion 110 are structurally connected to each other) by a distance (e.g., a predetermined distance). In this case, the distance between the lowest point P2 of the body portion 120 and the physical contact point P1 between the body portion 120 and the pin portion 110 may include grooves 121 or protruding portions 122 may be formed to protrude toward a bottom surface (e.g., a lower surface) of the body portion 120 (e.g., protruding toward the lowest point P2 of the body portion 120). One or more grooves 121 may be formed around the physical contact point P1 between the body portion 120 and the pin portion 110. That is, the grooves 121 may be formed between the pins of the pin portion 110 and at edges (e.g., outer edges) of the outer pins of the pin portion 110. Alternatively, the grooves 121 may be formed around peripheries or perimeters of the pins of the pin portion 110. For example, the protruding portion 122 may be formed to protrude (e.g., downwardly protrude) from the bottom surface (e.g., the lower surface) of the body portion 120. The protruding portions 122 may be formed at outsides (e.g., at outer sides) of the pin portion 110 in a state in which the protruding portions 122 are spaced from (e.g., spaced apart from) each other by a distance (e.g., a predetermined distance).

The grooves 121 or the protruding portions 122 may be formed as described above so that it is possible to have the distance between the lowest point P2 of the body portion 120 and the physical contact point P1 between the body portion 120 and the pin portion 110 (e.g., a height difference between the lowest point P2 of the body portion 120 and the physical contact point P1 between the body portion 120 and the pin portion 110).

As shown in FIG. 6, the interlock pin 100 may be accommodated inside the interlock pin accommodating portion 35. In this case, the body portion 120 of the interlock pin 100 may be first accommodated in the interlock pin accommodating portion 35, and the pin portion 110 may be located (e.g., placed) below the body portion 120 in this figure (e.g., the pin portion 110 may extend below the body portion 120 along the direction in which the interlock pin accommodating portion 35 is opened). If the cover portion 30 is connected to the pack housing 20, the pin portion 110 is inserted into the control portion 45. Meanwhile, a synthetic resin 36 may be filled between the interlock pin accommodating portion 35 and the interlock pin 100.

In this case, the protruding portion 122 of the body portion 120 may be contacted by an upper surface of the control portion 45. On the other hand, the physical contact point P1 between the body portion 120 and the pin portion 110 may be in a state in which a distance (e.g., a predetermined distance) is between the upper surface of the control portion 45 and the physical contact point P1 between the body portion 120 and the pin portion 110. That is, in a case where the grooves 121 and/or the protruding portions 122 are formed, the physical contact point P1 between the body portion 120 and the pin portion 110 may not be directly in contact with the upper surface of the control portion 45.

In a case where the physical contact point P1 between the body portion 120 and the pin portion 110 is spaced from (e.g., spaced apart from) the upper surface of the control portion 45, vibration transferred through the control portion 45 is not directly transferred to the physical contact point P1 between the body portion 120 and the pin portion 110 but is indirectly transferred to the physical contact point P1 between the body portion 120 and the pin portion 110 through the pins of the pin portion 110.

On the other hand, as shown in FIG. 7, in a case where a physical contact point P3 between a body portion 100k and a pin portion 110k is in contact with (e.g., in direct contact with) the upper surface of the control portion 45, vibration transferred through the control portion 45 is directly transferred to the physical contact point P3 between a body portion 100k and a pin portion 110k. In a case where the vibration is directly transferred at the physical contact point P3 between a body portion 100k and a pin portion 110k (e.g., where the vibration is transferred at the physical contact point P3 having a certain angle), a structural problem such as a fracture or crack may occur.

Accordingly, in the interlock pin 100 according to this embodiment, as shown in FIG. 6, the vibration transferred through the control portion 45 may not be directly transferred to the physical contact point P1 between the body portion 120 and the pin portion 110 but is instead indirectly transferred to the physical contact point P1 between the body portion 120 and the pin portion 110 through the pins of the pin portion 110. Thus, the vibration may be dispersed and/or a portion of the vibration may dissipate or be absorbed.

Meanwhile, the groove 121, as shown in FIG. 6, has an upper portion formed with a curved surface, that is, without an angular portion. In a case where the groove 121 has the angular portion, such as in the comparative example shown in FIG. 7, stress caused by the vibration remains in the corresponding portion (e.g., is not transferred from the corresponding portion), and therefore, the durability of the interlocking pin may be deteriorated.

Figure 8:
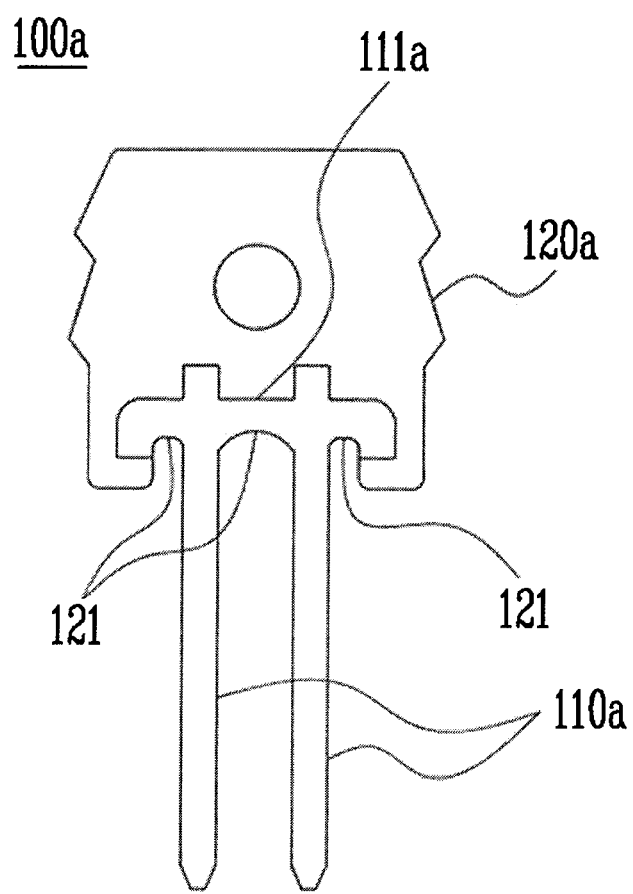
FIG. 8 is a longitudinal sectional view showing an interlock pin according to another embodiment of the present invention.

Hereinafter, an interlock pin according to another embodiment of the present invention will be described with reference FIG. 8. FIG. 8 is a longitudinal sectional view showing the interlock pin according to the another embodiment of the present invention.

As shown in FIG. 8, the interlock pin 100a according to this embodiment may be integrally formed with a pin portion 110a. That is, pins of the pin portion 110a may be coupled (e.g., electrically connected) to each other not through a body portion 120a but through a connecting portion 111a, so that current flowing in one of the pins of the pin portion 110a may be transferred (e.g., directly transferred) to another one of the pins of the pin portion 110a. That is, in this embodiment, the body portion 120a may not be formed of a conductive material.

Figure 9:
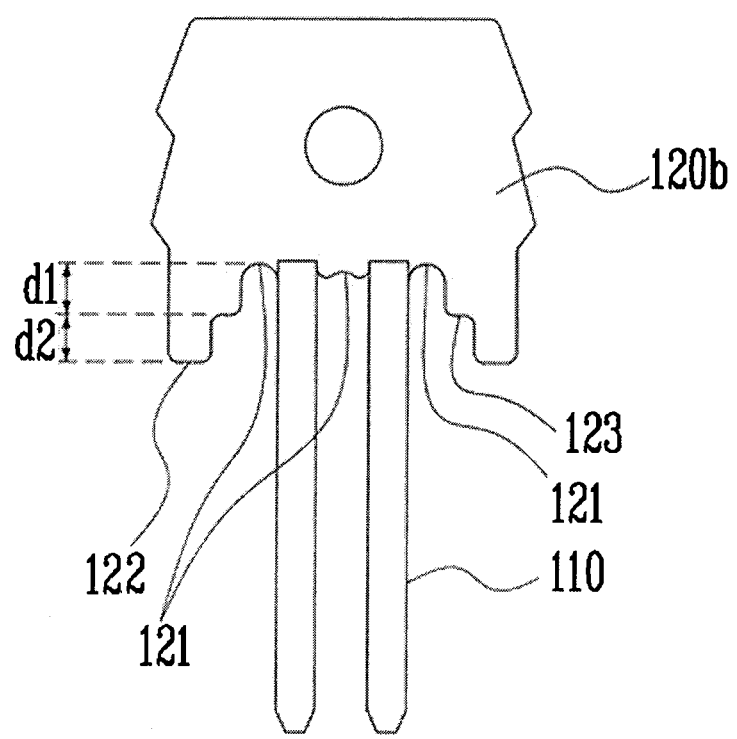
FIG. 9 is a longitudinal sectional view showing an interlock pin according to still another embodiment of the present invention.

Hereinafter, an interlock pin according to still another embodiment of the present invention will be described with reference to FIG. 9. FIG. 9 is a longitudinal sectional view showing the interlock pin according to the still another embodiment of the present invention.

The interlock pin 100b according to this embodiment, as compared with the embodiments described above, has a structure in which a distance (e.g., a vertical distance) between the lowest point of a body portion 120b and a physical contact point between the pin portion 110 and the body portion 120b is formed.

In the interlock pin 100b according to this embodiment, grooves 121 are recessed (e.g., upwardly recessed) from a bottom surface 123 (e.g., a lower surface) of the body portion 120b and protruding portions 122 that protrude from (e.g., downwardly protrude from) the bottom surface 123 are also formed.

Meanwhile, in the embodiments described above, a distance (e.g., a vertical distance) between the lowest point of the body portion and the physical contact point between the body portion and the pin portion may be formed to be greater than widths (e.g., horizontal distances) of the pins of the pin portion 110 so that impacts caused by vibration may be only minimally transferred.

For example, in this embodiment, the sum of a distance d1 between the bottom surface 123 and the upper surface of the grooves 121 and a distance d2 between the bottom surface 123 and an end (e.g., a lower end) of the protruding portion 122 may be formed to be greater than the widths of the pins of the pin portion 110.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. An interlock pin comprising:
a pin portion comprising a plurality of electrical input/output pins; and
a body portion accommodating at least a portion of the pin portion,
wherein the pins of the pin portion extend from a first end of the body portion in a first direction, and
a furthest point of the first end of the body portion from a second end of the body portion opposite the first end is further along the first direction than a furthest physical contact point between the body portion and the pin portion from the second end of the body portion along the first direction.

2. The interlock pin of claim 1, wherein one or more grooves are adjacent the physical contact point between the body portion and the pin portion.

3. The interlock pin of claim 2, wherein ones of the grooves are between the pins and at respective outer sides of the pins.

4. The interlock pin of claim 2, wherein the grooves extend around a perimeter of each of the pins.

5. The interlock pin of claim 2, wherein an upper surface of each of the grooves is upwardly curved.

6. The interlock pin of claim 1, wherein the body portion comprises protruding portions extending from a surface thereof, and the protruding portions are spaced from the pins.

7. The interlock pin of claim 6, wherein the protruding portions are at respective outer sides of the pins.

8. The interlock pin of claim 1, wherein the pin portion comprises an input pin, an output pin, and a connecting portion, the connecting portion coupling the input and output pins to each other.

9. The interlock pin of claim 1, wherein the pin portion comprises an input pin and an output pin, and
wherein the body portion comprises a conductive material and couples the input and output pins to each other.

10. A battery pack comprising:
an interlock pin comprising:
a pin portion comprising a plurality of input/output pins; and
a body portion accommodating at least a portion of the pin portion such that the pins of the in portion extend from a first end of the body portion in a first direction; and
a battery management system (BMS) comprising a control portion configured to accommodate the input/output pins,
wherein the BMS is configured to be electrically connected or disconnected by inserting or removing the input/output pins of the interlock pin into or from the control portion,
a physical contact point between the pin portion and the body portion is spaced from the control portion, and
a furthest point of the first end of the body portion from a second end of the body portion opposite the first end is further along the first direction than a furthest physical contact point between the body portion and the pin portion from the second end of the body portion along the first direction.

11. The battery pack of claim 10, further comprising:
a pack housing configured to accommodate one or more batteries and the BMS, the pack housing having an opening portion through which at least a portion of the control portion of the BMS is exposed; and
a cover portion configured to cover the opening portion, the cover portion having an interlock pin accommodating portion configured to accommodate at least a portion of the interlock pin.

12. The battery pack of claim 11, wherein a synthetic resin is between the interlock pin accommodating portion and the interlock pin.

13. The battery pack of claim 10, wherein the interlock pin has a groove at the physical contact point between the pin portion and the body portion and/or a protruding portion extending from a surface of the body portion.

14. The battery pack of claim 13, wherein a sum of a depth of the groove and a length of the protruding portion is greater than a width of the input/output pins.

* * * * *